(12) United States Patent
Orihashi et al.

(10) Patent No.: US 7,961,220 B2
(45) Date of Patent: Jun. 14, 2011

(54) CAMERA SHAKE CORRECTION MECHANISM AND IMAGE CAPTURE APPARATUS, INCLUDING HEAT DISSIPATING MECHANISM

(75) Inventors: Masaki Orihashi, Kanagawa (JP); Kazuhiko Suzuki, Kanagawa (JP); Ryuichi Yasuhara, Osaka (JP); Naoki Kamaya, Tokyo (JP)

(73) Assignee: Sony Corporation, Tokyo (JP)

( * ) Notice: Subject to any disclaimer, the term of this patent is extended or adjusted under 35 U.S.C. 154(b) by 366 days.

(21) Appl. No.: 11/837,126

(22) Filed: Aug. 10, 2007

(65) Prior Publication Data

US 2008/0055420 A1   Mar. 6, 2008

(30) Foreign Application Priority Data

Sep. 5, 2006   (JP) .................................. 2006-240388

(51) Int. Cl.
*H04N 5/351* (2006.01)

(52) U.S. Cl. ...................... 348/208.4; 348/208.7; 396/97

(58) Field of Classification Search .... 348/208.4–208.7; 257/732

See application file for complete search history.

(56) References Cited

U.S. PATENT DOCUMENTS

| | | |
|---|---|---|
| 2003/0067544 A1 | 4/2003 | Wada |
| 2006/0055787 A1 * | 3/2006 | Hirota et al. ............... 348/208.5 |
| 2006/0056049 A1 * | 3/2006 | Tokiwa et al. ................ 359/684 |
| 2006/0056829 A1 | 3/2006 | Hirota et al. |
| 2006/0266930 A1 * | 11/2006 | Misawa et al. ............. 250/214 R |
| 2008/0191124 A1 * | 8/2008 | Irikiin et al. ............... 250/208.1 |

FOREIGN PATENT DOCUMENTS

| | | |
|---|---|---|
| JP | 61-090459 | 5/1986 |
| JP | 07-298107 | 11/1995 |
| JP | 11-284889 | 10/1999 |
| JP | 2001-119615 | 4/2001 |
| JP | 2001-148437 | 5/2001 |
| JP | 2003-110929 | 4/2003 |
| JP | 2004-111665 | 4/2004 |
| JP | 2005-175854 | 6/2005 |
| JP | 2005-217993 | 8/2005 |
| JP | 2006-033857 | 2/2006 |
| JP | 2006-53232 | 2/2006 |
| JP | 2006-78891 | 3/2006 |
| JP | 2006-100564 | 4/2006 |
| JP | 2006-174226 | 6/2006 |

OTHER PUBLICATIONS

CoolPoly(R) E4507 PC and E5107 PPS Resin Datasheets, Cool Polymers, Inc., Aug. 8, 2007.*

* cited by examiner

*Primary Examiner* — David L Ometz
*Assistant Examiner* — Dwight Alex C Tejano
(74) *Attorney, Agent, or Firm* — Oblon, Spivak, McClelland, Maier & Neustadt, L.L.P.

(57) ABSTRACT

There is provided a camera-shake correction mechanism by which camera shaking is corrected for by moving an imaging device on a plane that is orthogonal to an optical axis and in directions that are mutually orthogonal. The mechanism includes a heat dissipating mechanism that diffuses heat from the imaging device into atmosphere from a rear surface of the imaging device.

17 Claims, 13 Drawing Sheets

CAMERA SHAKE CORRECTION MECHANISM AND IMAGE CAPTURE APPARATUS, INCLUDING HEAT DISSIPATING MECHANISM

BACKGROUND OF THE INVENTION

1. Field of the Invention

The present invention relates to a camera-shake correction mechanism that is adopted as a shaking correction function and the like for a digital still camera, digital video camera and the like, and which corrects for camera shaking, as well as to an image-capture apparatus equipped with such a mechanism.

2. Description of Related Art

There are three types of mechanisms that correct for or absorb the misalignment of the optical axis such as a camera-shake correction mechanism, anti-vibration mechanism and the like for an image-capture apparatus.

First, there is the "electronic camera-shake correction method" in which a blurred image received by an imaging device is corrected to a clearer image by having the position and color of the blurred image corrected electronically by some program.

Second, there is the "optical camera-shake correction method" in which a correction lens whose photographic lens is equipped with a vibration gyro mechanism is incorporated, and shaking is reduced by suppressing shifting of the light reaching the light receiving surface (image sensor) by correcting the optical axis by moving the correction lens in such a direction that the shaking would cancelled out.

Third, there is the "sensor shift camera-shake correction method" (for example, see Japanese Patent Application Publication No. 2003-110929 (Patent Document 1) and Japanese Patent Application Publication No. 2006-78891 (Patent Document 2)) in which camera shaking is corrected for by shifting back and forth, on a plane that is orthogonal to the optical axis, an imaging device in orthogonal directions.

In particular, the "sensor shift camera-shake correction method" does not require a lens for correcting shaking since the imaging device itself moves, and is advantageous in that it enables the realization of an image-capture apparatus that is small and that has a high picture quality shaking correction function.

SUMMARY OF THE INVENTION

Image-capture apparatuses that have a camera-shake correction function are likely to give rise to thermal noise since the imaging device therein tends to generate heat. An example of a cooling measure for an imaging device can be seen, for example, in the image-capture apparatus in Patent Document 1, where a cooling plate is provided between the imaging device and the substrate.

The third correction method is advantageous in that it does not require a lens for correction and in that compact high picture quality shaking correction can be realized, but since it is one in which the imaging device moves, it is difficult to efficiently dissipate heat from and cool the imaging device. The heat dissipating method in Patent Document 1 calls for a cooling plate between the imaging device and the substrate, and therefore, does not allow for efficient heat dissipation from the imaging device.

Accordingly, it is desirable to provide a camera-shake correction mechanism, as well as an image-capture apparatus equipped therewith, which is capable of reducing thermal noise by increasing heat dissipation from the imaging device even in the sensor shift camera-shake correction method. The present invention is made in view of such circumstances.

In an embodiment of the present invention, a camera-shake correction mechanism incorporates, into a camera-shake correction mechanism that corrects for camera shaking by moving the imaging device in mutually orthogonal directions along a plane that is orthogonal to the optical axis, a heat dissipating mechanism that diffuses the heat of an imaging device into the atmosphere from the rear surface of the imaging device.

In another embodiment of the present invention, an image-capture apparatus includes a camera-shake correction mechanism that corrects for camera shaking by moving the imaging device in mutually orthogonal directions along a plane that is orthogonal to the optical axis, and this camera-shake correction mechanism includes a heat dissipating mechanism that diffuses the heat of the imaging device into the atmosphere from the rear surface of the imaging device.

With a camera-shake correction mechanism and image-capture apparatus according to the embodiments described above, the heat of the imaging device that is generated during camera-shake correction operation is diffused into the atmosphere more easily.

When, as the heat dissipating mechanism, a heat dissipating section is provided on the rear surface of the imaging device and a plurality of fins for diffusing the heat from the imaging device into the atmosphere are provided on the main surface of this heat dissipating section, the heat dissipating section gains a larger area of contact with the atmosphere. Since the fins operate while in contact with the surrounding atmosphere as the imaging device operates when camera shaking is being corrected for, the heat dissipating effect of the imaging device is improved. In addition, if a heat conducting section that receives the heat diffused from the heat dissipating section and that dissipates it into the atmosphere is provided within the body of the image-capture apparatus, the heat from the heat dissipating section is expelled out of the image-capture apparatus via the heat conducting section, and the heat dissipating effect is further improved.

In addition, as the heat dissipating mechanism, if a heat dissipating section is provided on the rear surface of the imaging device, a first heat converting member, which is made of a material that converts the heat from the imaging device into far infrared rays, is provided on the main surface of this heat dissipating section, and a second heat converting member, which is made of a material that absorbs the far infrared rays radiated from the first heat converting member, is provided at a position facing the first heat converting member, the heat of the imaging device is absorbed by the first heat converting member and converted into far infrared rays, and these far infrared rays are then absorbed by the second heat converting member, thereby further improving heat dissipation from the imaging device. Further, if the second heat converting member is provided on the inner surface of the body of the image-capture apparatus, or on the heat conducting section that is provided within the body of the image-capture apparatus, the far infrared rays radiated from the first heat converting member are absorbed by the second heat converting member and are expelled out of the image-capture apparatus, thereby further improving heat dissipation from the imaging device. Ceramic materials may be used for the first and second heat converting members. As examples of modes for the first and second heat converting members, ceramic sheets and ceramic paints may be considered.

The camera-shake correction mechanism may include an imaging device holder that holds an imaging device that captures an image of a subject and a slider that is provided on the rear side of the imaging device and that moves while holding the imaging device holder. The heat dissipating mechanism may be constructed by having the imaging device holder and/or the slider include a molded part of a resin material having a heat conductivity of 1 W/mK or greater. Since the resin material can be molded to complex forms by way of injection molding, and since the heat conductivity of the resin material is high, the heat from the imaging device can escape to the imaging device holder and further out to the slider more easily. In addition, since the imaging device holder and the slider constructed with the resin material having a high heat conductivity have a high heat dissipation rate, the rise in temperature of the imaging device is alleviated as compared to a case where ABS, PC and PPS materials (with a heat conductivity of 0.2 to 0.5 W/mK) are used, and thermal noise is less likely to occur.

Further, when a plurality of fins for diffusing the heat from the imaging device into the atmosphere are provided on the slider, the slider gains a greater area of contact with the atmosphere by way of the fins, and since the fins of the slider operate while in contact with the surrounding atmosphere as the imaging device moves during camera-shake correction, the heat dissipation effect of the imaging device is further improved.

In addition, if the heat dissipating section is provided on the rear surface of the imaging device with a heat storing member, which is made of a material that absorbs the heat from the imaging device, between itself and the imaging device, the heat generated by the imaging device is absorbed, thereby making it possible to slow down the rate at which the temperature of the imaging device rises during camera-shake correction operation.

Further, if the heat dissipating section is provided on the rear surface of a substrate, which is electrically connected with the imaging device, via a heat conducting member that penetrates an opening section formed in the substrate, heat can be dissipated from the imaging device in a compact manner. In addition, if a heat storing member, which is made of a material that absorbs the heat from the imaging device, is provided on the rear surface of the substrate, the heat generated by the imaging device is absorbed, thereby further improving the heat dissipating effect.

The material that absorbs heat is solid at room temperature, but as the temperature rises, it liquefies or softens. By taking advantage of this phenomenon where heat is absorbed during phase transformation, the rise in temperature over time is made more gradual. Such a material may include alloys containing low melting point metals such as gallium, tin and the like, inorganic hydrated salts including sodium sulphate hydrate ($Na_2SO_4.10H_2O$), sodium thiosulphate hydrate ($Na_2S_2O_3.5H_2O$), sodium acetate hydrate ($CH_3COOH.3H_2O$) and the like, and organic compounds including paraffin ($C_{18}H_{38}$, $C_{20}H_{42}$, $C_{22}H_{46}$) and the like.

According to a camera-shake correction mechanism of the present invention and an image-capture apparatus equipped therewith, thermal noise can be reduced since heat dissipation of the imaging device is improved.

DETAILED DESCRIPTION OF EMBODIMENTS

Figure 1:
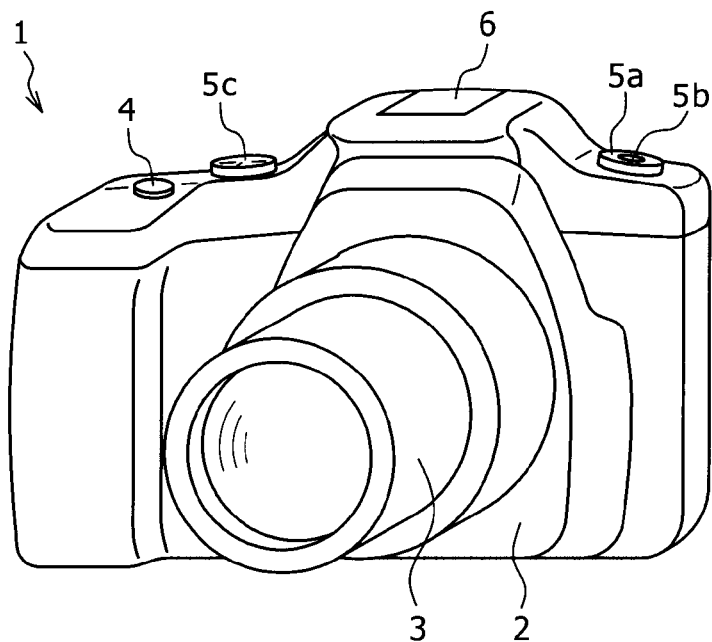
FIG. 1 is a perspective view of a digital camera related to an embodiment of the present invention as seen from the front side.
Figure 2:
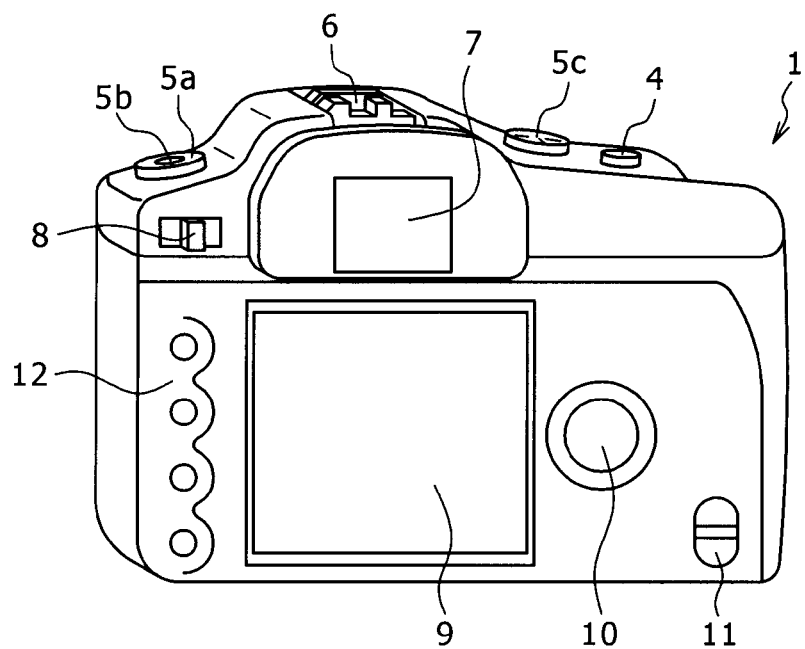
FIG. 2 is a perspective view of the digital camera as seen from the rear.
Figure 3:
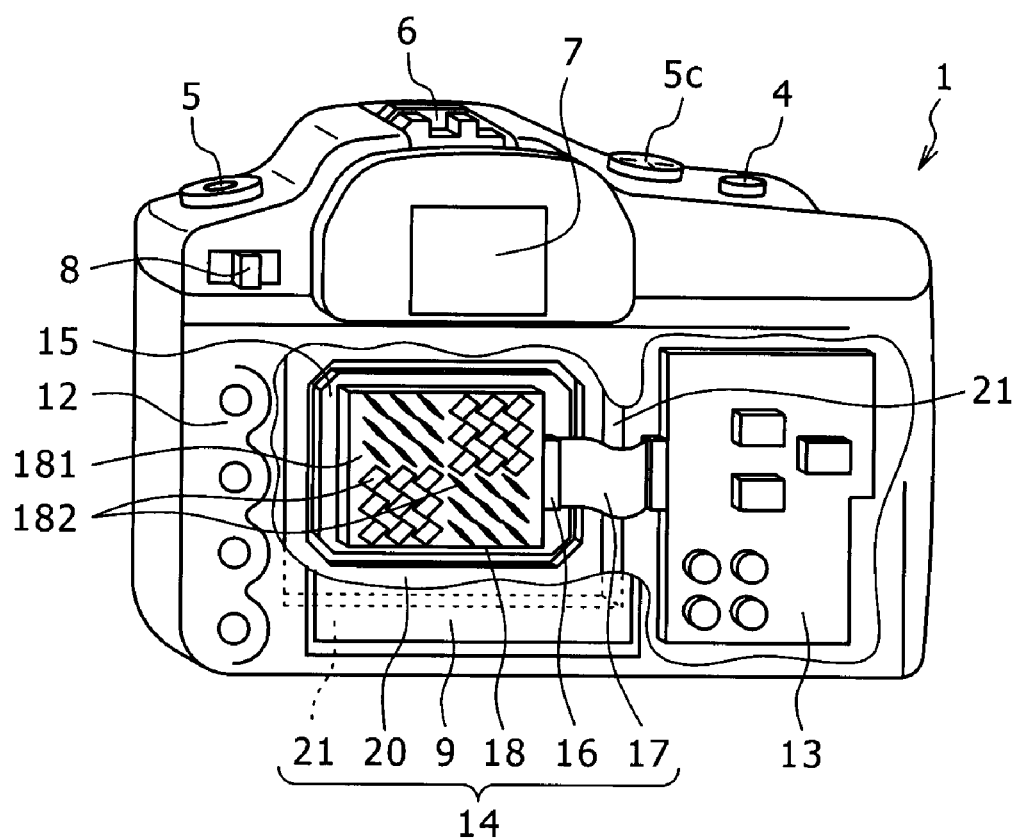
FIG. 3 is a perspective view that shows the inside of the camera body as seen from the rear side of the digital camera.

FIG. 1 is a perspective view of a digital still camera, which is an image-capture apparatus related to an embodiment of the present invention, as seen from the front side. FIG. 2 is a perspective view of the digital still camera as seen from the rear side. FIG. 3 is a perspective view that indicates the interior of the digital still camera as seen from the rear side.

A digital still camera 1 shown in FIG. 1 is an embodiment of a single-lens reflex digital still camera. A lens tube 3 is detachably provided on the front side of a camera body 2 in an approximately central portion. A grip section, which is to be held by the user's hand, is formed on the front left end section of the camera body 2. A shutter button 4 is provided on the upper end section of this grip section. A function dial 5a and a function button 5b are provided on the front upper right end section of the camera body 2, and a mode dial 5c is provided on an approximately front upper left end section of the camera body 2. An accessory shoe 6 is provided near the center section of the upper side of the camera body 2.

In addition, a finder 7 is provided in an approximately upper center portion of the rear side of the camera body 2 shown in FIG. 2. A power switch 8 is provided towards the left of the finder 7. A display section 9 is provided approximately in the center of the rear side of the camera body 2. Control buttons 10, such as an execute button, a spot AF button and the like, and a camera-shake correction switch 11 are provided towards the right of the display section 9. Control buttons 12, such as a menu button, a display switching button, a delete button, a play button and the like, are provided towards the left of the display section 9.

In the camera body 2 shown in FIG. 3, there are housed a main substrate 13 and a camera-shake correction mechanism 14. On the main substrate 13 are mounted an image processing LSI and the like. The camera-shake correction mechanism 14 is equipped with a substrate 15 that is vibratable in mutually orthogonal directions on a plane that is orthogonal to the optical axis. An imaging device, which is not shown in the drawing, is provided on the substrate 15. On the substrate 15 are mounted a drive IC and the like, and a connector 16 is also provided. A flexible printed wiring board 17 that electrically connects the main substrate 13 and the substrate 15 is attached to the connector 16. A heat dissipating section 18 is provided on the rear surface of the substrate 15. The substrate 15 is fixed to an imaging device holder 20, which is one of the elements of the camera-shake correction mechanism 14. A slider 21, which is one of the elements of the camera-shake correction mechanism 14, is attached to the imaging device holder 20.

Figure 4:
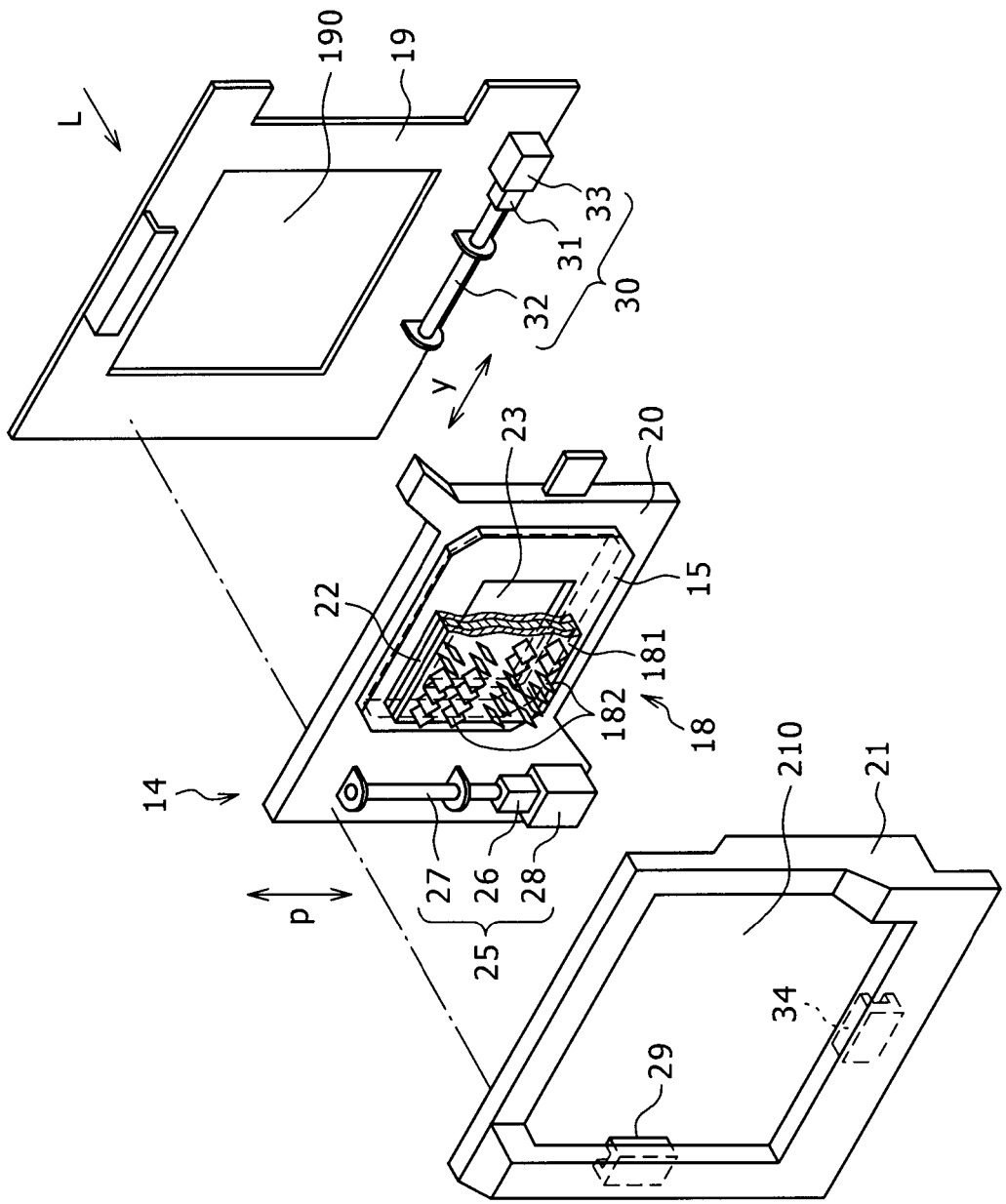
FIG. 4 is an exploded perspective view that illustrates the configuration of a camera-shake correction mechanism as seen from the side of a slider.
Figure 5:
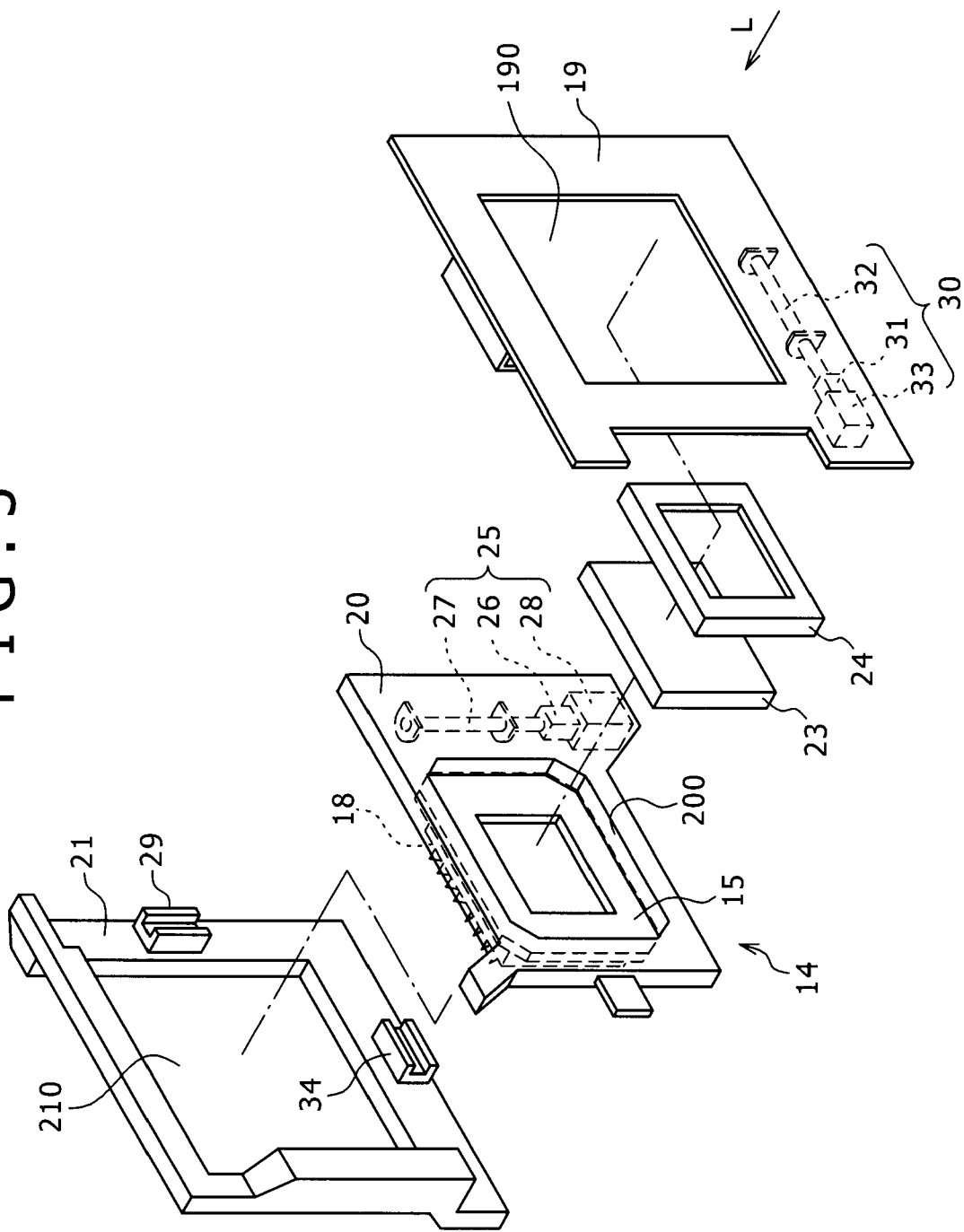
FIG. 5 is an exploded perspective view that illustrates the configuration of the camera-shake correction mechanism as seen from the side of its base.

FIG. 4 is an exploded perspective view of the configuration of the camera-shake correction mechanism as seen from the side of the slider. FIG. 5 is an exploded perspective view of the configuration of the camera-shake correction mechanism as seen from the side of its base.

As the camera-shake correction mechanism, the shaking correction unit disclosed in Japanese Patent Application Publication No. 2006-78891 may be adopted, for example. The camera-shake correction mechanism 14 may include a base 19, an imaging device holder 20 and a slider 21, and may take on such a form where these elements are stacked in the following order: the base 19, the imaging device holder 20, the slider 21. The heat dissipating section 18 is provided on the rear surface of the imaging device 22 that is held by the imaging device holder 20.

The base 19 is a base that is fixed within the camera body 2 in order to attach the imaging device holder 20 and the slider 21 inside the camera body 2. A four-sided window section 190 is formed in the base 19 so that the range of motion for the imaging device 22 during camera-shake correction can be secured. The slider 21 is a four-sided frame-like moving member that has a window section 210 formed therein in order to secure the range of motion (the range of motion indicated by arrow p in FIG. 4) of the imaging device 22 during camera-shake correction.

The imaging device holder 20 is a moving member that moves on the base 19 while holding the substrate 15. While there are provided, in the following order, the imaging device 22 and the heat dissipating section 18 on the rear surface of the substrate 15 as shown in FIG. 4, an optical filter 23 is attached to the front surface of the substrate 15 by a pressing member 24 as shown in FIG. 5. As shown in FIG. 4, the imaging device holder 20 is provided with a first piezoelectric actuator 25 as a first drive section, and the first piezoelectric actuator 25 is provided along one side of the imaging device 22. The first piezoelectric actuator 25 includes a piezoelectric device 26, a drive shaft 27 and a spindle member 28. The piezoelectric device 26 expands and contracts in accordance with a drive voltage based on a rectangular drive pulse voltage of a predetermined duty ratio, and thus performs a saw-teeth-like shaft displacement operation. The drive shaft 27 is fixed to the end of the piezoelectric device 26 on the side towards which it extends. The spindle member 28 is fixed to the other end of the piezoelectric device 26.

On the other hand, as shown in FIG. 5, a shaft bearing 29 that forms a frictional bond with the drive shaft 27 of the first piezoelectric actuator 25 is provided on the corresponding side of the slider 21. The drive shaft 27 is driven by the piezoelectric device 26 in such a manner that the imaging device holder 20, in relation to the slider 21, is vibrated in the direction indicated by arrow p in the drawing (pitch direction). In other words, a vibrating force that vibrates the imaging device 22 in a first direction (pitch direction) that is perpendicular to the optical axis L of the digital camera 1 is given at one of the side portions of the imaging device 22.

In addition, as shown in FIG. 4, the base 19 is similarly equipped with a second piezoelectric actuator 30 as a second drive section. The second piezoelectric actuator 30 includes a piezoelectric device 31, a drive shaft 32, and a spindle member 33. The piezoelectric device 31 expands and contracts in accordance with a drive voltage based on a rectangular drive pulse voltage of a predetermined duty ratio, and thus performs a saw-teeth-like shaft displacement operation. The drive shaft 32 is fixed to the end of the piezoelectric device 31 on the side towards which it extends. The spindle member 33 is fixed to the other end of the piezoelectric device 31.

On the other hand, as shown in FIG. 5, a shaft bearing 34 that forms a frictional bond with the drive shaft 32 is provided on the corresponding side of the slider 21. The drive shaft 32 is driven by the piezoelectric device 31 in such a manner that the slider 21, in relation to the base 19, is vibrated in the direction indicated by arrow y in the drawing. In other words, a vibrating force that vibrates the imaging device 22 in a second direction (yaw direction) that is perpendicular to both the optical axis L of the digital camera 1 and the first direction (pitch direction) is given at one of the side portions of the imaging device 22.

Because a vibrating mechanism including the first and second piezoelectric actuators 25 and 30 is provided, the imaging device 22 is freely movable in the pitch direction and the yaw direction. Therefore, it becomes possible to vibrate the imaging device 22 in accordance with the shaking experienced by the camera body 2. In addition, by appropriately driving the first and second piezoelectric actuators 25 and 30 based on the shake amount detected by a shake detection means, which is not shown in the drawing, shaking correction can be performed.

Figure 6:
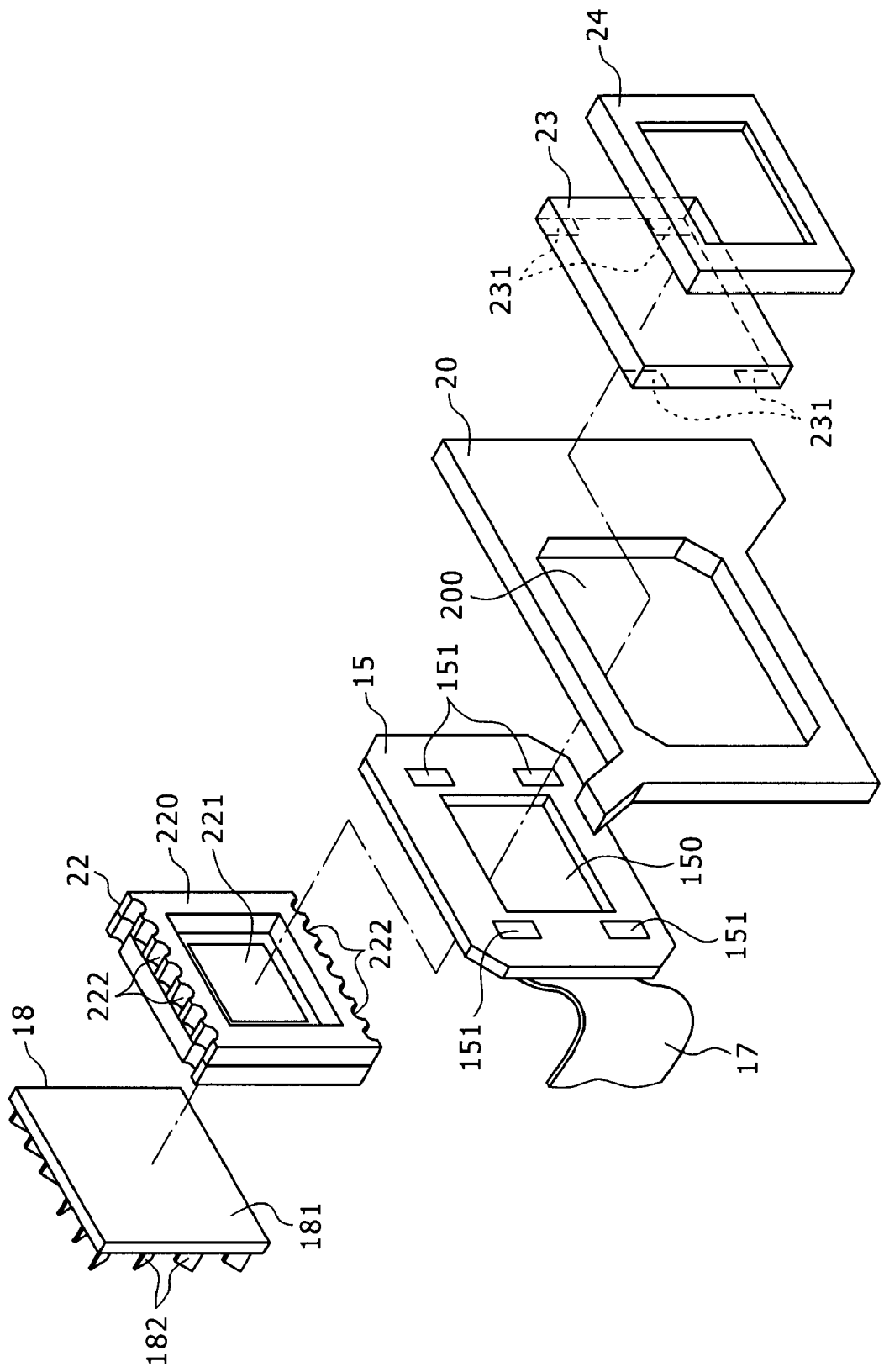
FIG. 6 is an exploded perspective view that illustrates how a substrate, an imaging device and a heat dissipating section are attached to an imaging device holder.
Figure 7:
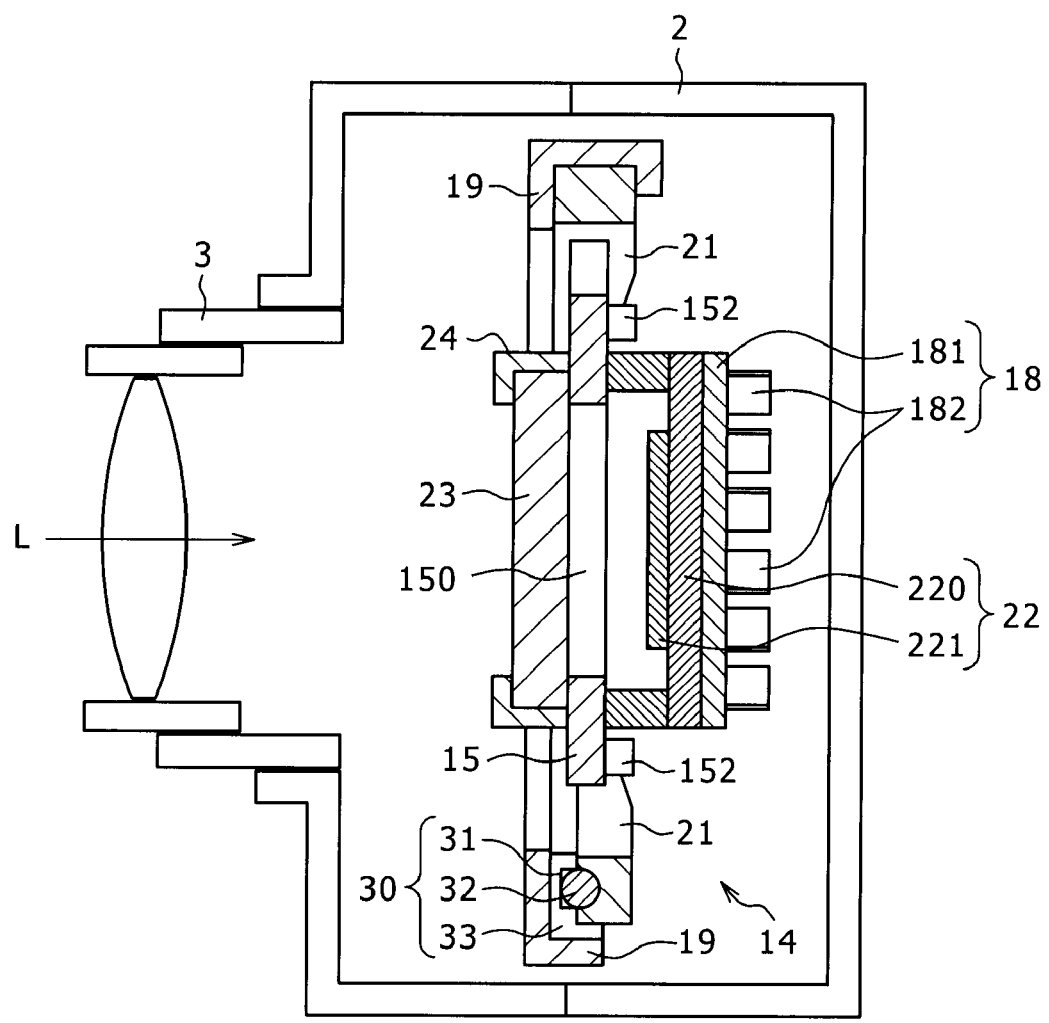
FIG. 7 is a sectional view illustrating one embodiment of a camera-shake correction mechanism where an imaging device is provided on the rear surface of a substrate.

FIG. 6 is a perspective view indicating how the substrate, the imaging device and the heat dissipating section are attached to the imaging device holder. FIG. 7 is a sectional view indicating one embodiment of a camera-shake correction mechanism in a case where the imaging device is provided on the rear surface of the substrate.

The substrate 15 and the imaging device 22 are based on the embodiments of the substrate and the imaging device of the image-capture apparatus disclosed in Japanese Patent Application Publication No. 2005-184468. As can be seen from FIG. 6 and FIG. 7, the optical filter 23, which has functions of an optical low pass filter, an infrared cut filter and the like, is provided on the front side of the substrate 15, while the imaging device 22 is provided on the rear surface. As shown in FIG. 7, the imaging device 22 and the optical filter 23 are provided in such a manner that their main surfaces are perpendicular to the optical axis L. The optical filter 23 is attached to the substrate 15 by means of the pressing member 24. An imaging device-side terminal 222 communicates signals with an imaging sensor section 221 of the imaging device 22 is provided on a package 220 of the imaging device 22.

As shown in FIG. 6, there is formed in the substrate 15 a light path opening section 150 for supplying a subject image, which is introduced via the optical filter 23, to the imaging sensor section 221 of the imaging device 22. In addition, as shown in FIG. 7, an output terminal 151 for supplying a drive voltage to an input terminal 231 of the optical filter 23 is provided on the front surface of the substrate 15, while a plurality of connection terminals, which are not shown in the drawing and which electrically connect with the imaging device-side terminal 222 of the imaging device 22 to communicate signals of the imaging sensor section 221 between itself and the imaging device-side terminal 222, are provided on the rear surface of the substrate 15. Further, the connector 16, to which the flexible printed wiring board 17 can be connected, a driver IC 152 and the like are provided on the rear surface. It is noted that the substrate 15 is screwed and thereby fixed to the imaging device holder 20.

The heat dissipating section 18 is provided in contact with the rear surface of the package 220 of the imaging device 22. The heat dissipating section 18 may be formed with a material that is used for known heat sinks. The heat dissipating section 18 is obtained by integrally molding a plurality of fins 182 on the main surface of a plate-shaped base 181 that can be attached to the rear surface of the package 220. The main surface of the base 181 is given a shape that fits with the form of the main surface of the imaging device 22. The fins 182 are formed in the shape of a plate or rod so as to secure as wide a contact area with the atmosphere as possible. When the fins 182 are given a plate-like shape, the fins 182 are provided in such a manner that their main surfaces are tilted by an appropriate angle with respect to the moving direction of the imaging device holder 20. For example, as shown in FIG. 3, the plurality of fins 182 of a plate-like shape are arranged in an X-like configuration on the base 181.

With the camera-shake correction mechanism 14 described above, the contact area between the heat dissipating section 18 and the atmosphere becomes greater, and the fins 182 operate while in contact with the surrounding atmosphere as the imaging device 22 operates during camera-shake correction. As a result, the heat dissipating effect of the imaging device 22 is improved. Thus, heat dissipation from the imaging device 22 is improved, and thermal noise can be reduced.

Figure 8:
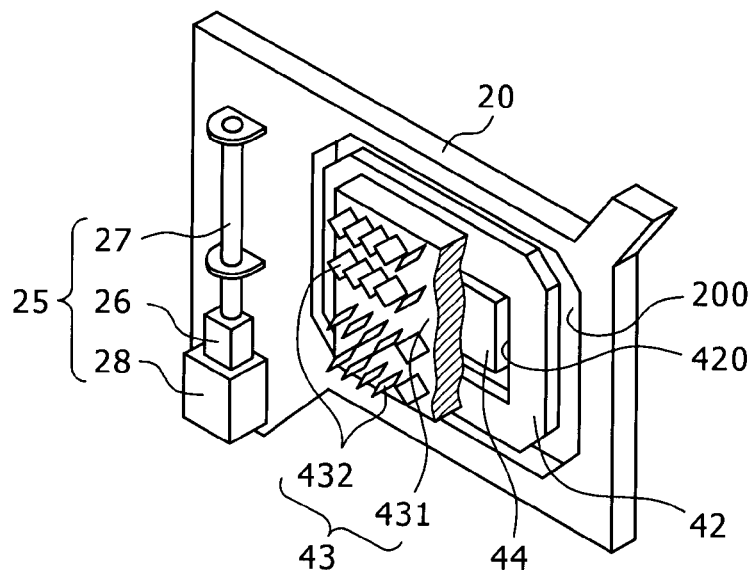
FIG. 8 is a perspective view illustrating an imaging device holder, which is an element of a camera-shake correction mechanism, in a case where an imaging device is provided on the front surface of a substrate.
Figure 9:
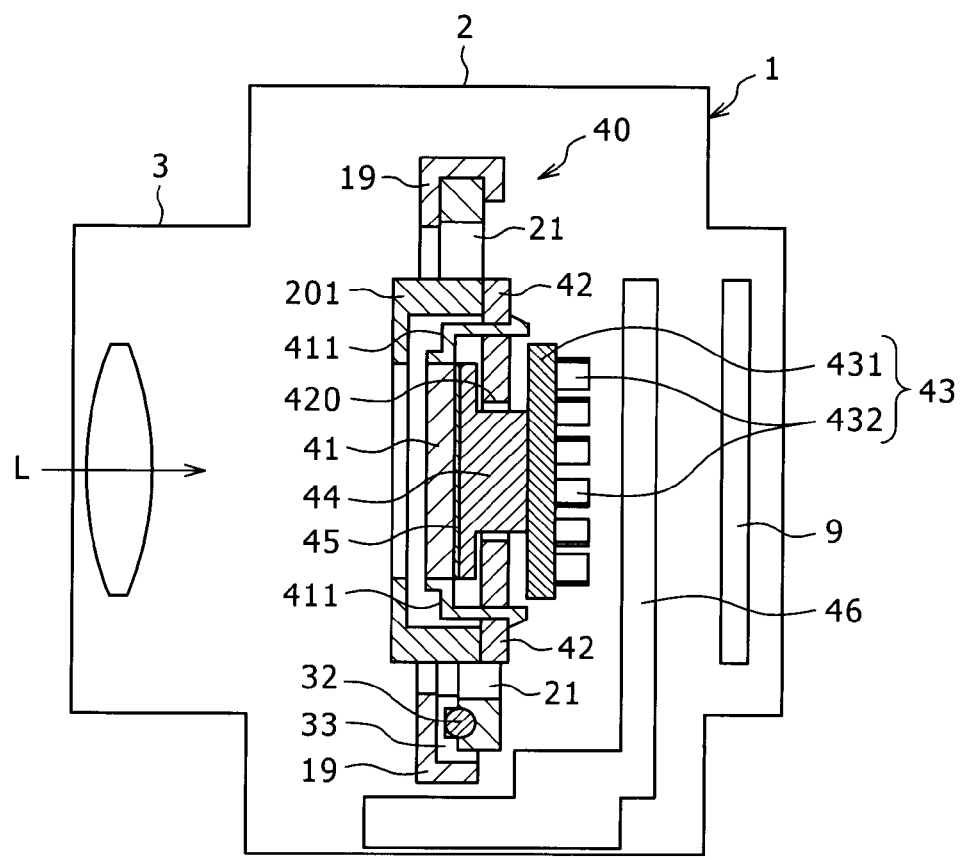
FIG. 9 is a sectional view illustrating one embodiment of a camera-shake correction mechanism where an imaging device is provided on the front surface of a substrate.

In addition, as an example of a camera-shake correction mechanism in which the imaging device is provided on the front side of the substrate, there is such an embodiment as the one shown in FIG. 8 and FIG. 9. FIG. 8 is a perspective view indicating an imaging device holder, which is an element of a camera-shake correction mechanism in a case where the imaging device is provided on the front side of the substrate. FIG. 9 is a sectional view indicating one embodiment of the camera-shake correction mechanism.

As shown in FIG. 9, a camera-shake correction mechanism 40 has an imaging device 41 provided on the front side of a substrate 42, while a heat dissipating section 43 is provided on the rear side of the substrate 42 with a predetermined distance kept between itself and the substrate 42. The imaging device 41 is provided in such a manner that its main surface is perpendicular to the optical axis L. The imaging device 41 is electrically connected with the substrate 42 via a lead 411. The substrate 42 is screwed and fixed to an imaging device holder 20 with the imaging device 41 housed within a housing section 201 provided in an opening section 200 in the imaging device holder 20.

The heat dissipating section 43 is obtained by integrally molding a plurality of fins 432 on the main surface of a base 431 that is formed in the shape of a plate. As with the heat dissipating section 23, the heat dissipating section 43 may be formed with a material that is used for known heat sinks. With respect to the fins 432, too, they are formed in the shape of a plate or rod so as to secure as wide a contact area with the atmosphere as possible. As shown in FIG. 8, when the fins 432 are given a plate-like shape, the fins 432 are provided in such a manner that their main surfaces are tilted by an appropriate angle with respect to the moving direction of the imaging device holder 20. As with the fins shown in FIG. 3, the plurality of plate-like fins 432 in this embodiment are also arranged in an X-like configuration on the base 431.

As shown in FIG. 9, the heat dissipating section 43 is connected with the imaging device 41 via a heat conducting section 44 that penetrates an opening section 420 formed in the substrate 42. The main surface of the heat conducting section 44 that comes into contact with the imaging device 41 is so formed to have a shape that is almost identical with the rear surface of the imaging device 41. Further, by having a heat conducting sheet 45 placed between the imaging device 41 and the heat conducting section 44 as deemed appropriate, the heat dissipating property of the imaging device 41 is improved. In addition, inside the camera body 2 (the chassis), at a position opposite the heat dissipating section 43, there is provided a heat conducting section 46 that receives the heat diffused from the heat dissipating section 43 and dissipates it into the atmosphere outside the camera body 2. The heat conducting section 46 may be formed using the same material as the heat dissipating section 43.

As in the camera-shake correction mechanism 40 described above, by having the heat dissipating section 43, which is equipped with the fins 432, provided on the rear side of the substrate 42 via the heat conducting section 44 that penetrates the opening section 420 formed in the substrate 42 that is electrically connected with the imaging device 41, heat can be dissipated from the imaging device 41 in a compact manner, and the heat dissipating effect is improved since the heat from the heat dissipating section 43 is expelled out of the camera body 2 via the heat conducting section 46. Thus, heat dissipation from the imaging device 41 is improved, and thermal noise is reduced.

Further, in place of the fin-type heat dissipating section 43, a heat converting member made of a material that converts the heat from the imaging device into far infrared rays may be used as in the embodiment of a heat dissipating mechanism shown in FIGS. 10 through 13.

Figure 10:
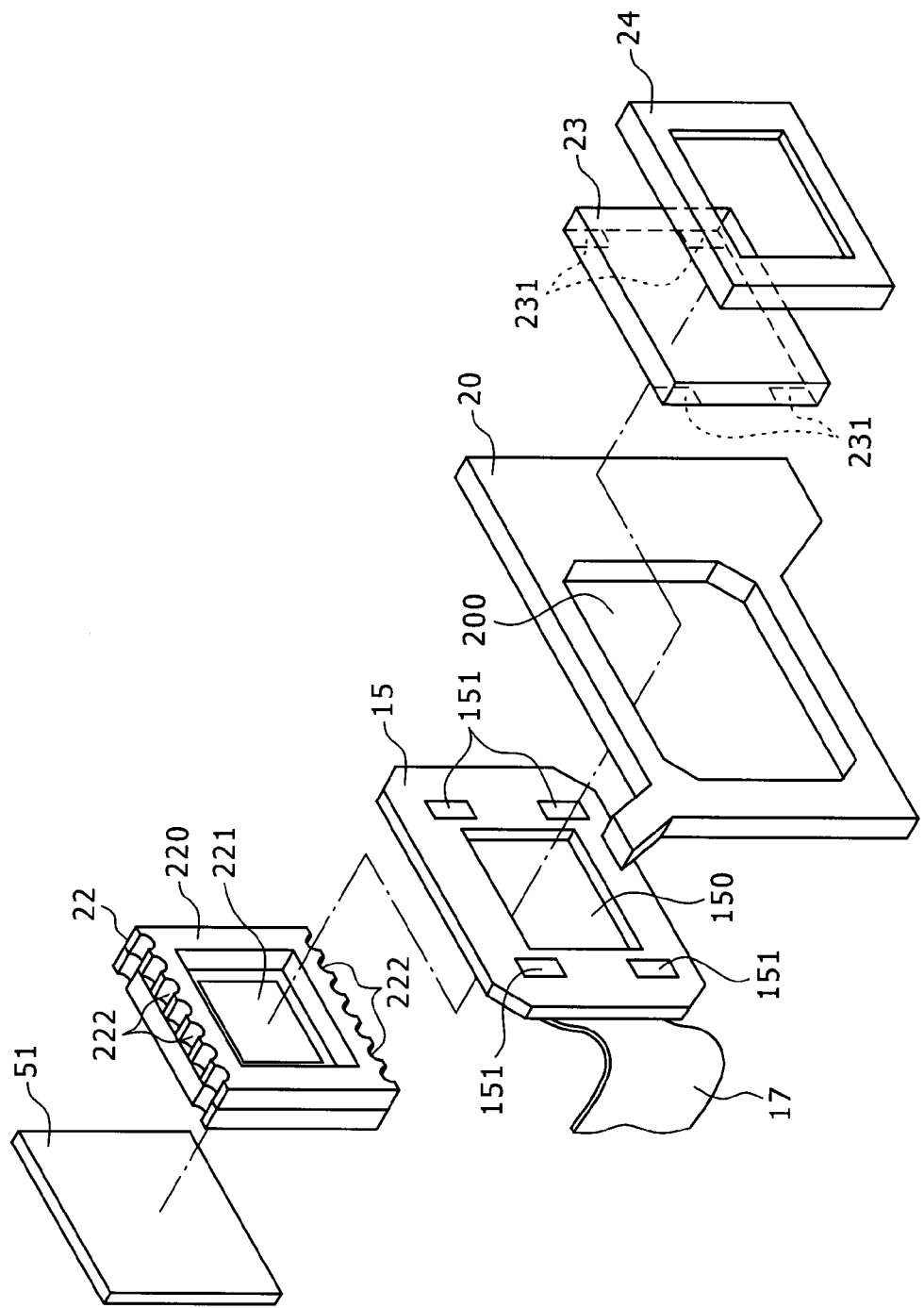
FIG. 10 is an exploded perspective view that illustrates how a substrate, an imaging device and a ceramic sheet are attached to an imaging device holder in a case where the imaging device is provided on the rear surface of the substrate.
Figure 11:
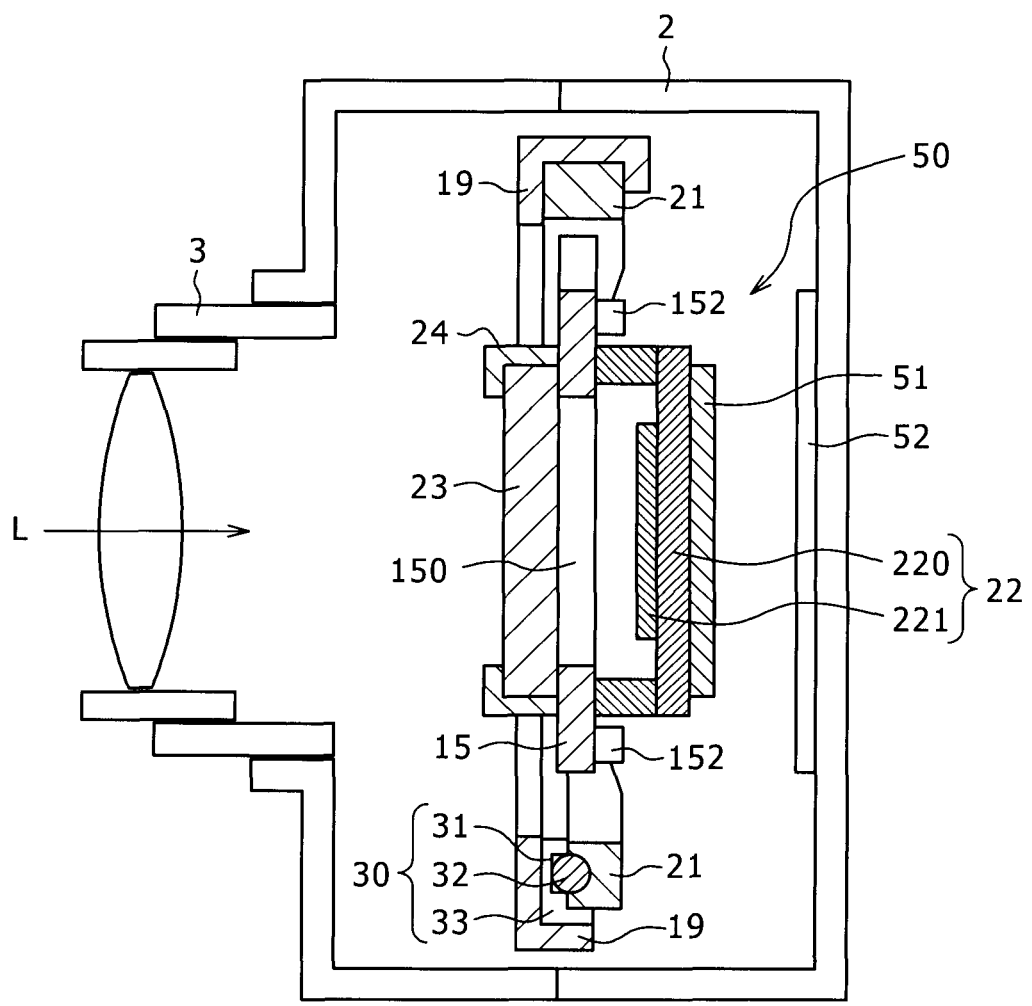
FIG. 11 is a sectional view illustrating one embodiment of a camera-shake correction mechanism in a case where an imaging device is provided on the rear surface of a substrate.

FIG. 10 is an exploded perspective view indicating how a substrate, an imaging device and a ceramic sheet are attached to an imaging device holder in a case where the imaging device is provided on the rear surface of the substrate. FIG. 11 is a sectional view indicating one embodiment of a camera-shake correction mechanism equipped with the imaging device holder.

As shown in FIG. 10 and FIG. 11, as a heat converting member that is made of a material that converts the heat from the imaging device into far infrared rays, a ceramic sheet 51 is provided, in place of the fin-type heat dissipating section 23 of the camera-shake correction mechanism 14, on the rear surface of the imaging device 22 that is held by the imaging device holder 20, which is an element of a camera-shake correction mechanism 50. In addition, as shown in FIG. 11, on an internal surface of the camera body 2 that faces the ceramic sheet 51, there is adhered a ceramic sheet 52 that receives the heat radiated from the ceramic sheet 51. Taking into account the range of motion of the ceramic sheet 51 during camera-shake correction, the area across which the ceramic sheet 52 is provided is at least to be larger than the ceramic sheet 51. The ceramic sheet 52 may be of the same material as the ceramic sheet 51. The ceramic sheets 51 and 52 may be based on the far infrared ray transferring member which radiates or absorbs far infrared rays and which is made of the ceramic material disclosed in Japanese Patent Application Publication No. 2005-222585. The far infrared ray transferring member may be of a hard type obtained by applying a ceramic material onto an aluminum base and the like, or it may be one that uses a flexible film base.

In addition, as another embodiment of the heat converting member, a ceramic paint that includes the ceramic material may be applied onto the imaging device holder 20, the imaging device 22, the rear surface of the substrate 15, and the internal surface of the camera body 2 facing the rear surface of the substrate 15.

With the camera-shake correction mechanism 50 described above, heat diffusion from the imaging device 22 is further improved. In particular, by providing the ceramic sheet 52 on the internal surface of the camera body 2, the far infrared rays radiated from the ceramic sheet 51 are absorbed by the ceramic sheet 52 and expelled out of the camera body 2, thereby further improving heat dissipation of the imaging device 22. Thus, heat dissipation of the imaging device 22 is improved, and thermal noise is reduced.

Figure 12:
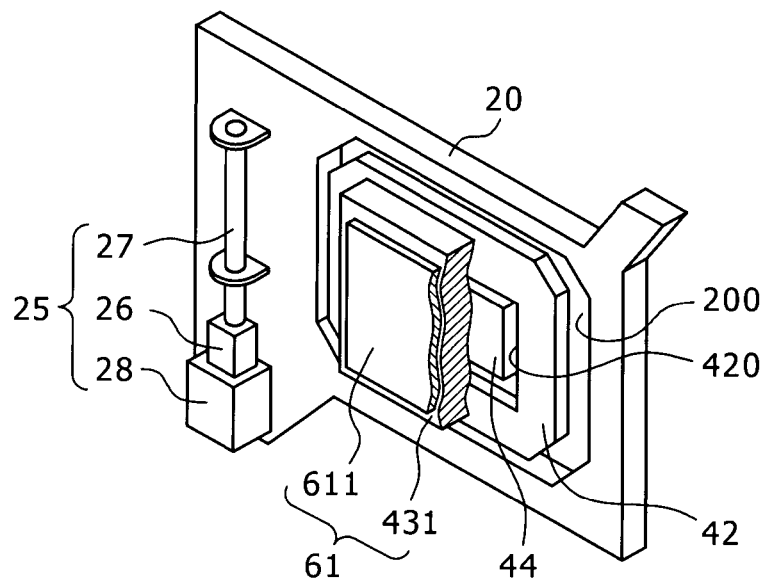
FIG. 12 is a perspective view illustrating an imaging device holder, which is an element of a camera-shake correction mechanism, in a case where an imaging device is provided on the front surface of a substrate.
Figure 13:
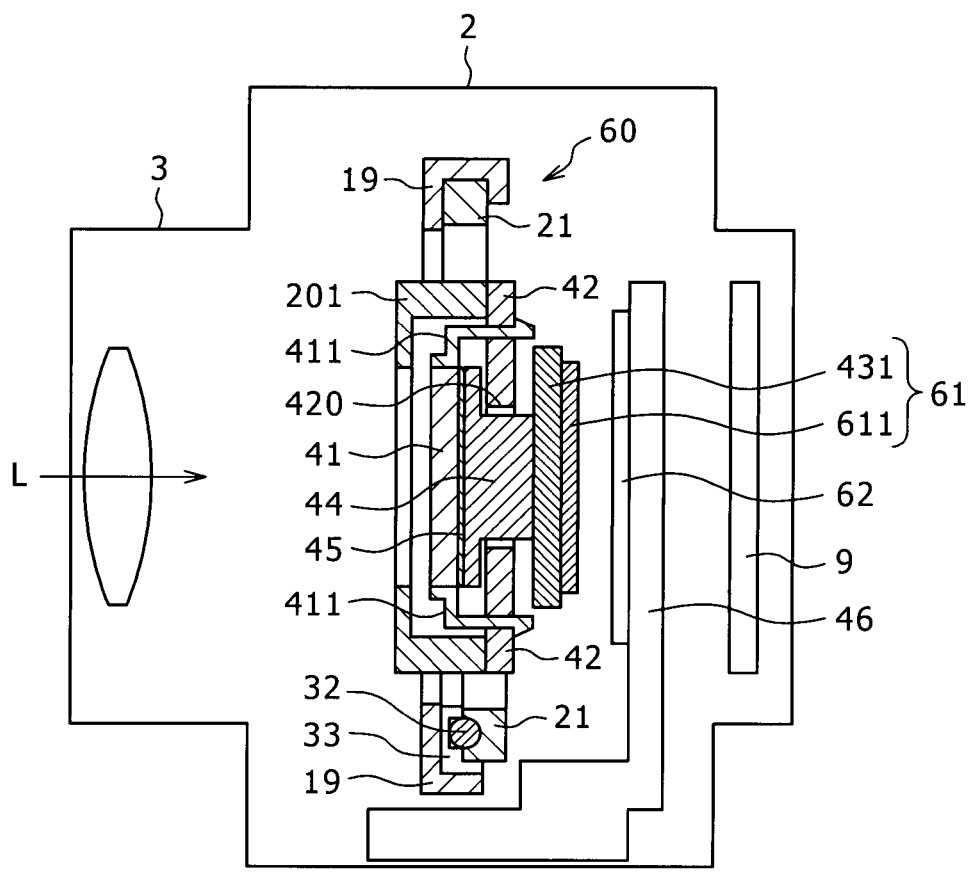
FIG. 13 is a sectional view illustrating one embodiment of a camera-shake correction mechanism where an imaging device is provided on the front surface of a substrate.

FIG. 12 is a perspective view indicating an imaging device holder, which is an element of a camera-shake correction mechanism, in a case where an imaging device is provided on the front surface of a substrate. FIG. 13 is a sectional view indicating one embodiment of a camera-shake correction mechanism in a case where an imaging device is provided on the front surface of a substrate.

As shown in FIGS. 12 and 13, a camera-shake correction mechanism 60 is arranged such that, in place of the fins 432 of the heat dissipating section 43 of the camera-shake correction mechanism 40 shown in FIG. 8, a ceramic sheet 611 is provided, as a heat converting member made of a material that converts the heat from the imaging device 41 into far infrared rays, on the rear surface (main surface) of the base 431 of the heat dissipating section 43. In addition, as shown in FIG. 13, on a surface of the heat conducting section 46 that is provided within the camera body 2 so as to face ceramic sheet 611 is adhered a ceramic sheet 62 that receives the heat radiated from the ceramic sheet 611. Taking into account the range of motion of the ceramic sheet 611 during camera-shake correction, the area across which the ceramic sheet 62 is provided is at least to be larger than the ceramic sheet 611. The ceramic sheets 62 and 611 may be formed using the same material as the ceramic sheets 51 and 52. In addition, as another embodiment of the heat converting member, a ceramic paint that includes the ceramic material used for the ceramic sheets 62 and 611 may be applied on the rear surface (main surface) of the heat dissipating section 43 as well as on the surface of the heat conducting section 46 that faces the rear surface of the heat dissipating section 43 within the camera body 2. It is noted that while in the present embodiment the heat converting member is provided on the imaging device 41 with the heat conducting section 44 in between, it is possible to further reduce the weight of a digital camera by directly adhering or applying the heat converting member on the imaging device holder 20, the imaging device 41 and the rear surface of the substrate 42.

With the camera-shake correction mechanism 60 described above, by providing the ceramic sheet 62 on the heat conducting section 46 within the camera body 2, the far infrared rays radiated from the ceramic sheet 611 are absorbed by the ceramic sheet 62, and are expelled out of the camera body 2 via the heat conducting section 46, thereby further improving heat dissipation from the imaging device 22. Thus, heat dissipation of the imaging device 22 is improved, and thermal noise is reduced.

In the camera-shake correction mechanisms shown in FIGS. 4 through 13, it is preferable that the imaging device holder 20 and/or the slider 21 be formed using a material that has a high heat conductivity. Such a material may include polycarbonate (PC), a PC/ABS (acrylonitrile butadiene styrene) alloys, polyphenyl sulphide (PPS) or the like. These resin materials may be made to contain glass fibers as a filler for securing dimensional stability. In addition, in order to improve the heat conductivity of the resin materials, one or more of the following may be included therein: carbon fiber or graphite powder having a heat conductivity of 100 W/mK or greater, a ceramic powder such as carbon nanotube (CNT), alumina or the like. Alternatively, alloys of low melting point metals may be included therein.

Table 1 indicates the difference in the temperature of an imaging device (samples 1 through 3) ten minutes after beginning continuous shooting with a single-lens reflex camera whose power consumption is 1.5 W and room temperature (in an environment of 25° C.). An imaging device holder made of PC whose heat conductivity is 0.2 W/mK and a slider made of PPS whose heat conductivity is 0.4 W/mK are incorporated into the imaging device of sample 1. An imaging device holder made of PC whose heat conductivity is 6 W/mK and a slider made of PPS whose heat conductivity is 0.4 W/mK are incorporated into the imaging device of sample 2. An imaging device holder made of PC whose heat conductivity is 6 W/mK and a slider made of PPS whose heat conductivity is 8 W/mK are incorporated into the imaging device of sample 3. The values indicated in the table represent the difference between the temperature of the samples (imaging devices) and room temperature (in an environment of 25° C.).

TABLE 1

|  | Sample 1 | | Sample 2 | | Sample 3 | |
| --- | --- | --- | --- | --- | --- | --- |
|  | Constituting Material | Heat Conductivity | Constituting Material | Heat Conductivity | Constituting Material | Heat Conductivity |
| Material of Imaging Device Holder | PC | 0.2 | PC | 6 | PC | 6 |
| Material of Slider | PPS | 0.4 | PPS | 0.4 | PPS | 8 |

TABLE 1-continued

|  | Sample 1 | | Sample 2 | | Sample 3 | |
| --- | --- | --- | --- | --- | --- | --- |
|  | Constituting Material | Heat Conductivity | Constituting Material | Heat Conductivity | Constituting Material | Heat Conductivity |
| Difference between Imaging Device and Room Temp. (25°) | 40.8° C. | | 38.4° C. | | 35.8° C. | |

The unit of heat conductivity is "W/mk".

As can be seen from the results indicated in table 1, by using materials having a high heat conductivity for the imaging device holder 20 and the slider 21, heat from the imaging device can be diffused, and the heat dissipating property of the imaging device can be improved.

In addition, with the camera-shake correction mechanisms 14, 40, 50 and 60, when a plurality of fins are provided on the slider 21, the area of contact between the slider and the atmosphere becomes greater, and at the same time, the fins of the slider operate while in contact with the surrounding atmosphere when the imaging device holder moves during camera-shake correction, thereby further improving the heat dissipating property of the imaging device.

Figure 15:
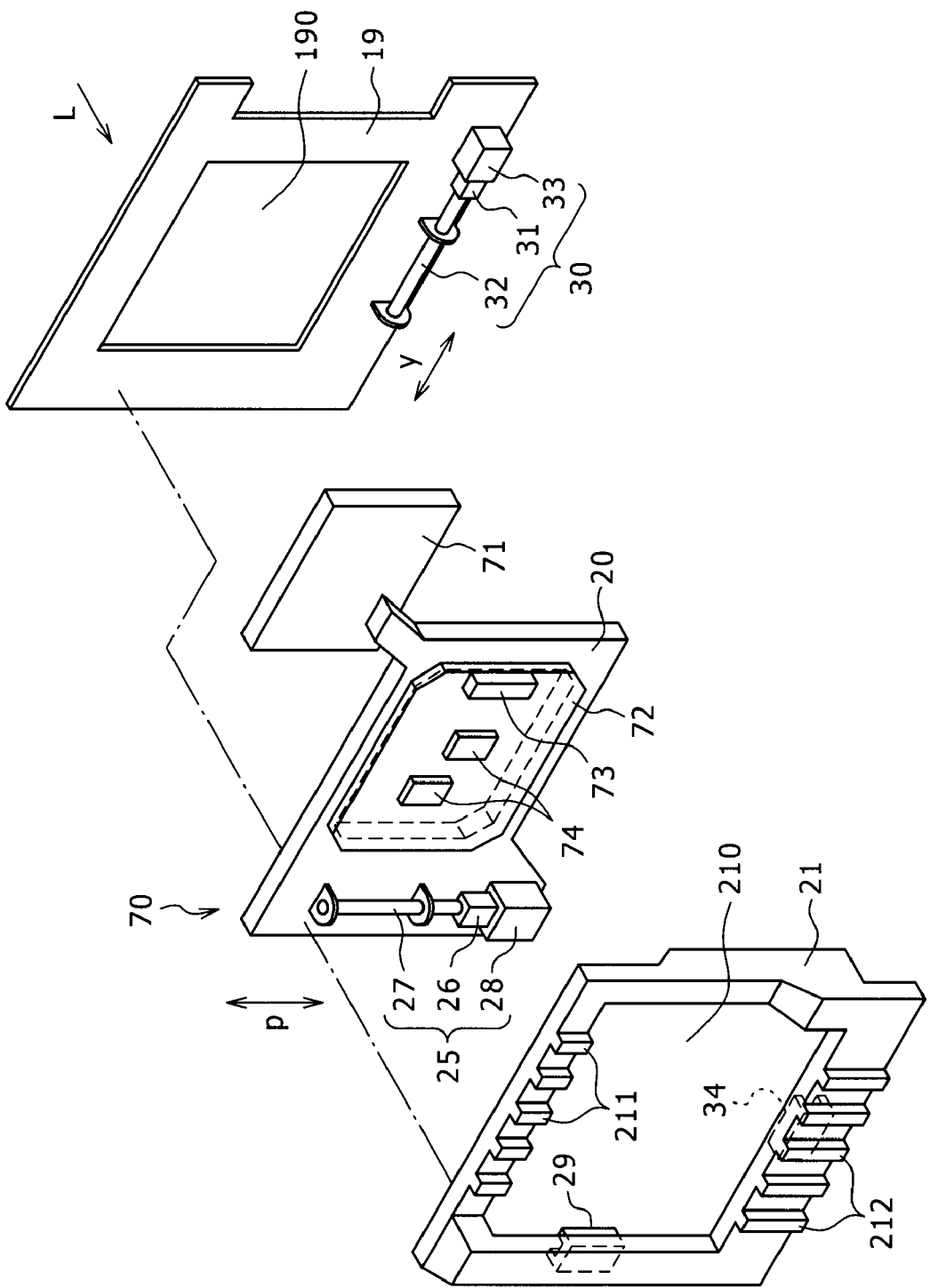
FIG. 15 is an exploded perspective view illustrating one embodiment of a heat dissipating mechanism that is provided in the camera-shake correction mechanism when a substrate is provided on the rear side of an imaging device.

Further, as another embodiment of a camera-shake correction mechanism in which a heat dissipating mechanism is constructed by providing fins on a slider, there is a camera-shake correction mechanism 70 shown in FIG. 15.

The camera-shake correction mechanism 70 is based on the camera-shake correction unit disclosed in Japanese Patent Application Publication No. 2006-78891. The camera-shake correction mechanism 70 includes a base 19, an imaging device holder 20 that holds an imaging device 71 that captures an image of a subject, and a slider 21 that moves while holding the imaging device holder 20. The imaging device holder 20 is provided on the rear side of the imaging device 71. A substrate 72 is fixed to the imaging device holder 20. The imaging device 71 is electrically connected to the substrate 72. The imaging device 71 is connected to the substrate 72 in such a manner that the main surface (light receiving surface) of the imaging device 71 is perpendicular to the optical axis L. A connector 73 and a driver IC 74 are provided on the rear surface of the substrate 72. A flexible printed wiring board 17 that electrically connects the main substrate 13 and the substrate 72 is provided on the connector 73.

The heat dissipating mechanism of the imaging device 71 is constructed by having the imaging device holder 20 and/or the slider 21 include a molded part of a resin material having a heat conductivity of 1 W/mK or above. As a result, the heat of the imaging device 71 is more readily able to escape from the rear surface of the imaging device 71 into the atmosphere via the imaging device holder 20 and the slider 21, thereby improving the heat dissipating property of the imaging device 71.

In addition, a plurality of fins 211 and 212 which are formed in the shape of a rectangular parallelepiped and which diffuse the heat from the imaging device 71 into the atmosphere are provided on the edge portion of the slider 21. As a result, the area of contact with the atmosphere becomes greater, and at the same time, the fins 211 and 212 of the slider 21 operate while in contact with the surrounding atmosphere when the imaging device 71 operates during camera-shake correction, thereby further improving the heat dissipating property of the imaging device 71. The fins 211 are provided on the upper edge portion of an opening 210 in the slider 21. The fins 212 are provided on the lower edge portion of the opening 210 in the slider 21. As with the fins 182 and 432, when the fins 211 and 212 are provided in a state where they are tilted by an appropriate angle in relation to the direction in which the slider 21 moves as indicated by arrow Y, the area of contact with the surrounding atmosphere becomes greater, and their heat dissipating effect is improved. In addition, the form of the fins 211 and 212 are not limited to a rectangular parallelepiped, and they may instead take on other forms such as a plate-like shape, for example.

In addition to using a material that has a high heat conductivity for the imaging device holder 20 and the slider 21 to diffuse the heat, by providing a heat storing member on the imaging devices 22 and 41 and on the rear surface of the substrate 15, and by substituting the heat storing member described below for the heat conducting sheet 45 that is placed between the imaging device 41 and the heat conducting section 44, it is possible to suppress the rise in temperature of the imaging devices 22 and 41 in cases where the temperature of the devices, such as the imaging device and the like, rises over a short period of time, an example of such a case being when a digital camera is in continuous shooting mode, for instance.

Figure 16:
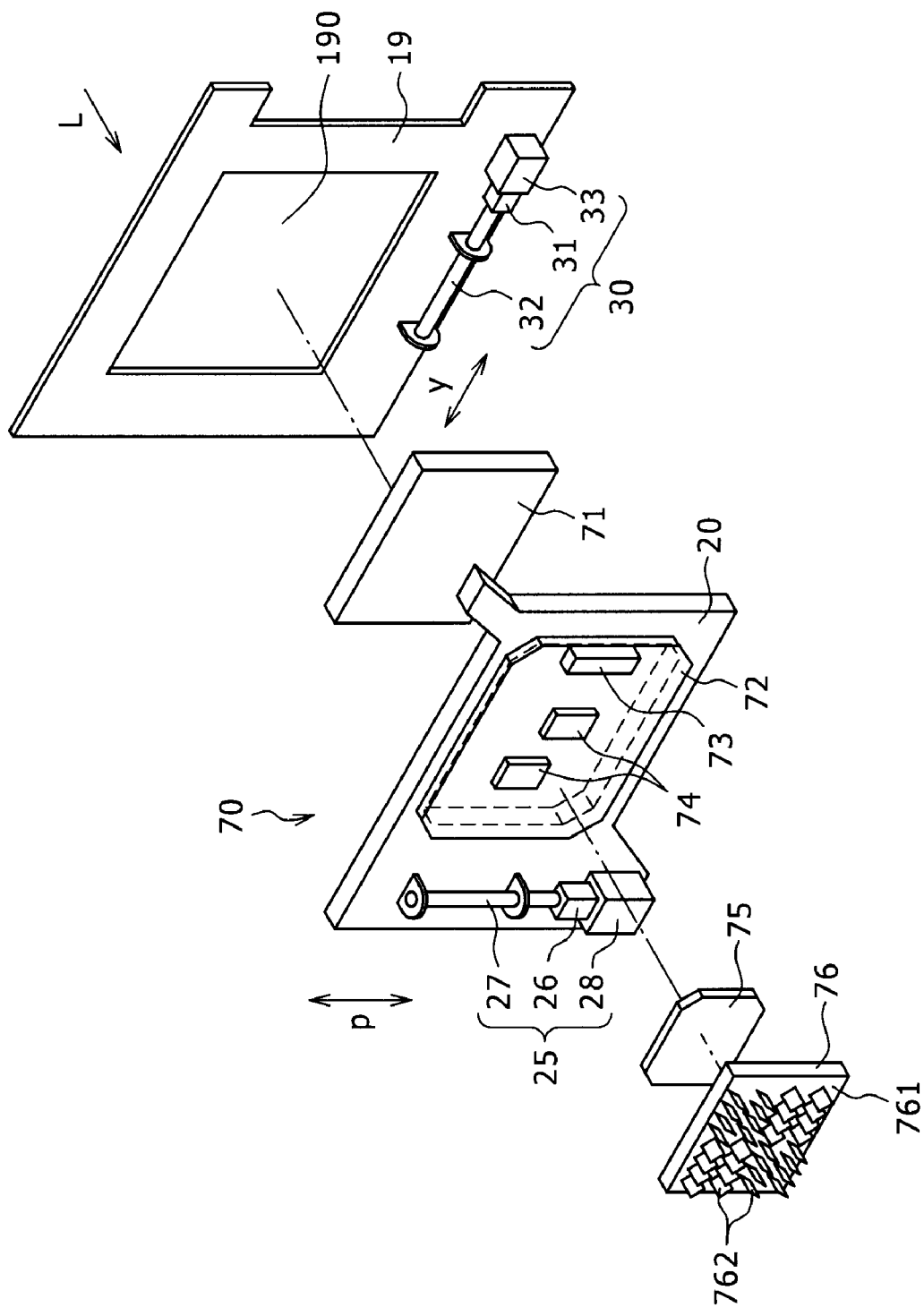
FIG. 16 is an exploded perspective view illustrating one embodiment of a heat dissipating mechanism that is provided in the camera-shake correction mechanism when a substrate is provided on the rear side of an imaging device.

Further, as in the heat dissipating mechanism indicated in FIG. 16, with respect to the configuration of the camera-shake correction mechanism 70, a heat dissipating section 76 may be provided in such a manner that a heat storing member 75 made of a heat storing material is placed between the heat dissipating section 76 and the rear surface of a substrate 72 held by the imaging device holder 20. The heat dissipating section 76 is arranged such that a plurality of fins 762 are provided on the main surface of a base 760 that comes into contact with the heat storing member 75. The heat dissipating section 76 may be made using the same or similar material as the heat dissipating section 18. With such a configuration, too, it is possible to suppress the rise in temperature of the imaging device in cases where the temperature of the devices, such as the imaging device and the like, rises over a short period of time, an example of such a case being when a digital camera is in continuous shooting mode, for instance. It is noted that in this embodiment, too, as with the fins shown in FIG. 3, it is preferable that the plurality of plate-shaped fins 762 be arranged in an X-like configuration on the base 761.

As the heat storing material for the heat storing member, materials that absorb heat, examples of which may include alloys of low melting point metals such as gallium, tin and the like, inorganic salt hydrates such as sodium sulphate hydrate ($Na_2SO_4.10H_2O$), sodium thiosulphate hydrate ($Na_2S_2O_3.5H_2O$), sodium acetate hydrate ($CH_3COOH.3H_2O$) and the like, organic compounds such as paraffin ($C_{18}H_{38}$, $C_{20}H_{42}$, $C_{22}H_{46}$ and the like) and the like, and so forth, may be considered. These materials are solid at room temperature, but they absorb heat and liquefy or soften as the temperature rises. They mitigate the temperature rise over time utilizing this phenomenon where heat is absorbed during phase change.

For the sealing of the materials, PET, PEN and the like may be used, while they may also be encapsulated inside acryl or silicone rubber. If the reliability of the heat storing material, such as its expansion, is of concern, other possible modes for the heat storing member may include ones where the heat storing material is sealed in an aluminum coated polymer sheet, or where it is sealed in a thin-wall molded aluminum box as in batteries. In attaching to the imaging device, which is a heat source, a sheet or a box in which a heat storing material is sealed, it may be fixed using a double-sided adhesive tape, or it may be insulated and pressed from above.

Figure 14:
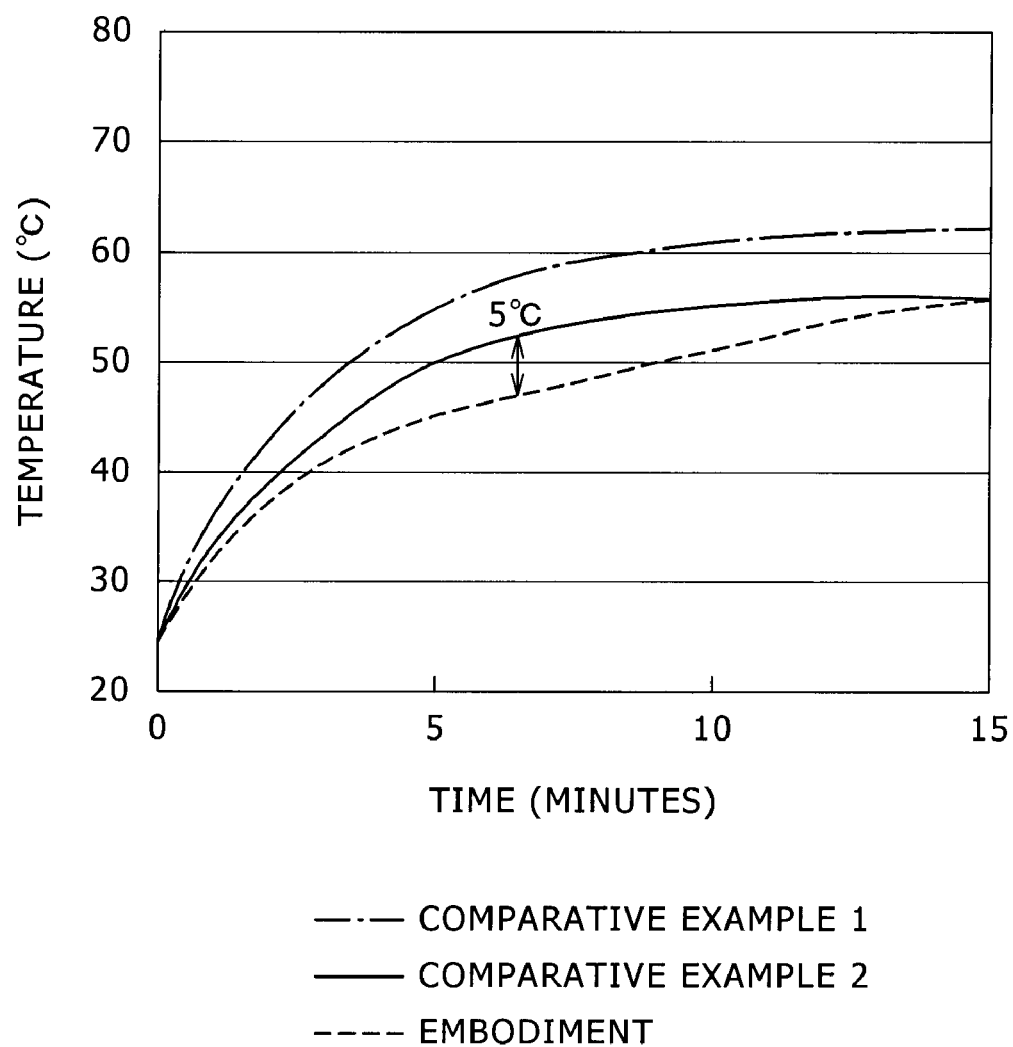
FIG. 14 is a characteristics chart illustrating the change in the temperature of an imaging device over time for a case where a heat storing member is attached to a substrate that is provided on the rear side of the imaging device (embodiment), for a case where an aluminum plate is attached to the substrate (comparative example 2), and for a case where neither the heat storing member nor the aluminum plate is attached to the substrate (comparative example 1)

FIG. 14 is a characteristics chart indicating the change in the temperature of an imaging device over time for a case where a heat storing member is attached to a substrate that is provided on the rear side of the imaging device (embodiment), for a case where an aluminum plate is attached to the substrate (comparative example 2), and for a case where neither the heat storing member nor the aluminum plate is attached to the substrate (comparative example 1).

The temperature of an imaging device over a given period was measured to confirm its temperature lowering property, and in this particular embodiment, a heat storing member, which is obtained by laminating 8 grams of paraffin (whose melting point is 42 to 44° C.) with an aluminum coated polymer sheet, is attached to the reverse side of a substrate that is provided on the rear side of the imaging device into which an imaging device holder, which is made of PC whose heat conductivity is 6 W/mK, and a slider, which is made of PPS whose heat conductivity is 8 W/mK, are incorporated.

In addition, as comparative example 2, the temperature lowering property of an imaging device in a case where, in place of the heat storing member, an aluminum plate weighing 0.8 grams is attached to the reverse side of a substrate provided on the rear side of the imaging device was confirmed. The aluminum plate is insulated with 15 μM of PET, and is attached to the substrate using a double-sided adhesive tape. Further, as comparative example 1, the temperature lowering property of an imaging device in a case where neither the heat storing member, nor the aluminum plate is provided was confirmed.

In the characteristics chart of FIG. 14, the change in the temperature of the imaging devices of the embodiment, comparative example 1 and comparative example 2 over a period of 15 minutes after beginning continuous shooting is indicated. As is apparent from this characteristics chart, because the heat capacity increases by attaching the aluminum plate or the heat storing member to the substrate provided on the rear side of the imaging device, the temperature is lower as compared to the case where they are not attached. Further, comparing the effectiveness of the aluminum plate and the heat storing member, when the heat storing member is attached to the substrate, because the paraffin gradually melts and absorbs heat, the temperature rises more slowly as compared to the case where the aluminum plate is attached to the substrate. Ultimately, the temperature of the CCD becomes comparable to the case where the aluminum plate is attached. In practice, it is not likely that continuous shooting would be performed for more than 10 minutes, and therefore the heat storing member is sufficiently worthwhile in addition to changing the material of the imaging device holder and the slider. It is obvious that the effect described above can also be obtained in cases where the heat storing member is directly attached to the rear surface of the imaging device. It is noted that in order to change the temperature at which the rise in temperature becomes gradual, one may use a heat storing member of a different melting point, and that in order to make the rise in temperature gradual over a longer period of time, one may increase the amount of the heat storing member.

The camera-shake correction mechanism as well as the image-capture apparatus of the present invention is by no means limited to the embodiments described above. For designs that are simpler and smaller, the imaging device holder 20 and the slider 21 may be constructed with light metals such as aluminum alloys, magnesium alloys and the like.

The present application contains subject matters related to Japanese Patent Application No. 2006-240388 filed in Japanese Patent Office on Sep. 5, 2006, the entire content of which being incorporated herein by reference.

It should be understood by those skilled in the art that various modifications, combinations, sub-combinations, and alterations may occur depending on design requirements and other factors insofar as they are within the scope of appended claims and equivalents thereof.

What is claimed is:

1. A camera-shake correction mechanism that corrects camera shaking by moving an imaging device on a plane that is orthogonal to an optical axis and in directions that are mutually orthogonal, the camera-shake correction mechanism comprising:

a heat dissipating mechanism configured to diffuse heat from the imaging device, the heat dissipating mechanism including
a heat dissipating section directly connected to the imaging device and configured to diffuse heat from the imaging device into an atmosphere,
a plurality of fins, provided on a main surface of the heat dissipating section, each of the plurality of fins having a main surface arranged at a predetermined angle with respect to movement of the imaging device to diffuse the heat from the imaging device into the atmosphere, and
a heat conducting section to diffuse heat from the heat dissipating section into the atmosphere, the heat conducting section being located behind the heat dissipating section in a direction of the optical axis and at a side of the heat dissipating mechanism in a direction perpendicular to the optical axis, the heat conducting section having a length less than a length of the camera-shake correction mechanism in a direction perpendicular to the optical axis.

2. A camera-shake correction mechanism that corrects camera shaking by moving an imaging device on a plane that is orthogonal to an optical axis and in directions that are mutually orthogonal, the camera-shake correction mechanism comprising:

a heat dissipating mechanism configured to diffuse heat from the imaging device, the heat dissipating mechanism including
a heat dissipating section directly connected to the imaging device and configured to diffuse heat from the imaging device into an atmosphere,
a first heat converting member, provided on a main surface of the heat dissipating section, the first heat converting member including a material to convert the heat from the imaging device into far infrared rays,
a second heat converting member, provided at a position facing the first heat converting member, the second heat converting member including a material to absorb the far infrared rays radiated from the first heat converting member, and
a heat conducting section to diffuse heat from the heat dissipating section into the atmosphere, the heat conducting section being located behind the heat dissipating section in a direction of the optical axis and at a side of the heat dissipating mechanism in a direction perpendicular to the optical axis, the heat conducting section having a length less than a length of the camera-shake correction mechanism in a direction perpendicular to the optical axis.

3. The camera-shake correction mechanism according to claim 1, further comprising:
an imaging device holder configured to hold the imaging device that captures an image of a subject; and
a slider provided on a rear side of the imaging device, the slider being movable while holding the imaging device holder,
wherein one or both of the imaging device holder and the slider are formed with molded parts of a resin material having a heat conductivity of 1 W/mK or greater.

4. The camera-shake correction mechanism according to claim 3, further comprising:
a plurality of fins provided on the slider, the plurality of fins being configured to diffuse the heat from the imaging device into the atmosphere.

5. The camera-shake correction mechanism according to claim 1, further comprising:
a heat storing member including a material configured to absorb the heat from the imaging device,
wherein the heat dissipating section is provided on the rear surface of the imaging device with the heat storing member placed between the heat dissipating section and the imaging device.

6. The camera-shake correction mechanism according to claim 2, further comprising:
a heat storing member including a material configured to absorb the heat from the imaging device,
wherein the heat dissipating section is provided on the rear surface of the imaging device with the heat storing member placed between the heat dissipating section and the imaging device.

7. The camera-shake correction mechanism according to claim 1, further comprising:
a substrate electrically connected with the imaging device; and
a heat conducting member configured to penetrate an opening section formed in the substrate,
wherein the heat dissipating section is provided on a rear surface of the substrate with the heat conducting member placed between the heat dissipating section and the substrate.

8. The camera-shake correction mechanism according to claim 2, further comprising:
a substrate electrically connected with the imaging device; and
a heat conducting member configured to penetrate an opening section formed in the substrate,
wherein the heat dissipating section is provided on a rear surface of the substrate with the heat conducting member placed between the heat dissipating section and the substrate.

9. The camera-shake correction mechanism according to claim 7, further comprising:
a heat storing member provided on the rear surface of the substrate, the heat storing member including a material to absorb the heat from the imaging device.

10. The camera-shake correction mechanism according to claim 8, further comprising:
a heat storing member provided on the rear surface of the substrate, the heat storing member including a material to absorb the heat from the imaging device.

11. An image-capture apparatus, comprising:
an imaging device;
a camera-shake correction mechanism to correct camera shaking by moving the imaging device on a plane orthogonal to an optical axis and in mutually orthogonal directions, the camera-shake correction mechanism including
a heat dissipating mechanism configured to diffuse heat from the imaging device, the heat dissipating mechanism including
a heat dissipating section directly connected to the imaging device and configured to diffuse the heat from the imaging device into an atmosphere,
a plurality of fins, provided on a main surface of the heat dissipating section, each of the plurality of fins having a main surface arranged at a predetermined angle with respect to movement of the imaging device to diffuse the heat from the imaging device into the atmosphere, and
a heat conducting section to diffuse heat from the heat dissipating section into the atmosphere, the heat conducting section being located behind the heat dissipating section in a direction of the optical axis and at a side of the heat dissipating mechanism in a direction perpendicular to the optical axis, the heat conducting section having a length less than a length of the camera-shake correction mechanism in a direction perpendicular to the optical axis.

12. An image-capture apparatus, comprising:
an imaging device;
a camera-shake correction mechanism to correct camera shaking by moving the imaging device on a plane orthogonal to an optical axis and in mutually orthogonal directions, the camera-shake correction mechanism including
a heat dissipating mechanism configured to diffuse heat from the imaging device, the heat dissipating mechanism including
a heat dissipating section directly connected to the imaging device and configured to diffuse heat from the imaging device into an atmosphere,
a first heat converting member, provided on a main surface of the heat dissipating section, the first heat converting member including a material to convert the heat from the imaging device into far infrared rays,
a second heat converting member, provided at a position facing the first heat converting member, the second heat converting member including a material to absorb the far infrared rays radiated from the first heat converting member, and
a heat conducting section to diffuse heat from the heat dissipating section into the atmosphere, the heat conducting section being located behind the heat dissipating section in a direction of the optical axis and at a side of the heat dissipating mechanism in a direction perpendicular to the optical axis, the heat conducting section having a length less than a length of the camera-shake correction mechanism in a direction perpendicular to the optical axis.

13. The image-capture apparatus according to claim 11, wherein the camera-shake correction mechanism includes:
an imaging device holder configured to hold the imaging device that captures an image of a subject; and a slider provided on the rear side of the imaging device, the slider being movable while holding the imaging device holder, wherein one or both of the imaging device holder and the slider are formed with molded parts of a resin material having a heat conductivity of 1 W/mK or greater.

14. The image-capture apparatus according to claim 12, wherein:

the second heat converting member is provided on an internal surface of a body of the image-capture apparatus.

15. The image-capture apparatus according to claim 12, wherein the second heat converting member is provided on the heat conducting section.

16. The camera-shake correction mechanism according to claim 1, wherein the plurality of fins are tilted with respect to each other to form a pattern in a shape of an X.

17. The image-capture apparatus according to claim 11, wherein the plurality of fins are tilted with respect to each other to form a pattern in a shape of an X.

* * * * *